J. P. HARRIS.
Millstone-Dresses.

No. 138,021

Patented April 22, 1873.

WITNESSES
W. T. Newman
O. Drake

INVENTOR
John P. Harris,
By Leggett & Leggett
attys

UNITED STATES PATENT OFFICE.

JOHN P. HARRIS, OF GREENESBOROUGH, GEORGIA.

IMPROVEMENT IN MILLSTONE-DRESSES.

Specification forming part of Letters Patent No. 138,021, dated April 22, 1873; application filed March 31, 1873.

*To all whom it may concern:*

Be it known that I, JOHN P. HARRIS, of Greenesborough, in the county of Greene and State of Georgia, have invented certain new and useful Improvements in Dressing Millstones; and I do hereby declare the following to be a full, clear, and exact description of the invention, such as will enable others skilled in the art to which it appertains to make and use it, reference being had to the accompanying drawing, which forms part of this specification.

My invention relates to millstones, and consists in the peculiar manner of dressing the same.

Figure 1:
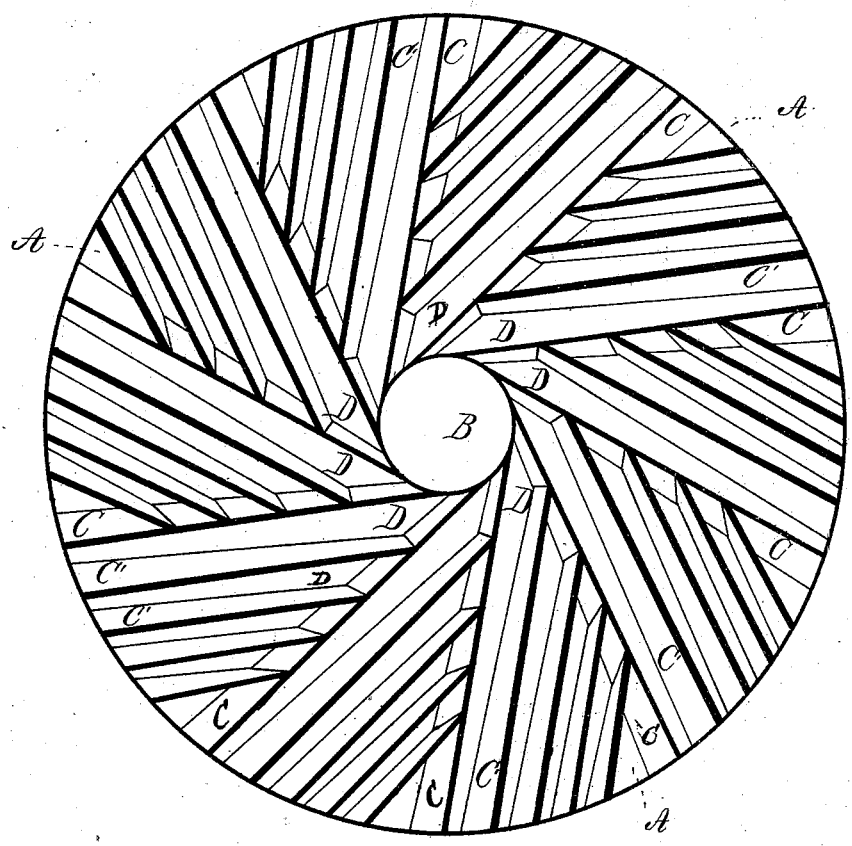
Figure 2:
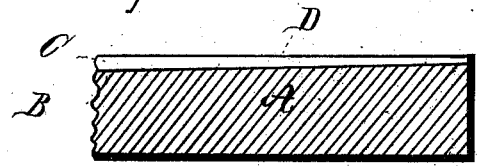

In the drawing, Figure 1 is a plan view of my invention; and Fig. 2, a section of same, showing the dipping-furrow.

A is a millstone, and B a circular opening in the center of same. Tangent to the opening B are made the long furrows C C, which extend to the periphery of the stone A. From these furrows proceed the lesser furrows C' C', parallel to each other, and also parallel to the next succeeding tangent furrow C C. Instead of forming the furrows C C' with a uniform width throughout, they are made to widen as they approach the periphery of the stone A, and as they thus widen their depth decreases, being therefore the deepest at their narrowest parts. By thus widening the furrows C C' from within to the periphery, the lands D D are correspondingly diminished in breadth as they approach the periphery.

By these provisions, I obtain a uniformly decreasing grinding-surface approaching the periphery of the stone, while in the same direction, by the widening furrows C C', a free and easy exit is afforded the ground material. Power is economized by thus performing the chief part of the labor at the central portion of the stone, where the leverage is shortest, and the friction is diminished uniformly from the center.

Having thus described my invention, what I claim as new, and desire to secure by Letters Patent, is—

The millstone-dress consisting of the furrows C C', deepest at the center, and widening toward the periphery of the stone, in combination with the lands D D, widening toward the center of the stone, substantially as and for the purposes set forth.

In testimony that I claim the foregoing I have hereunto set my hand this 29th day of March, 1873.

JOHN P. HARRIS.

Witnesses:
B. BRYANT,
E. F. LEGGETT.